United States Patent [19]  [11] 4,401,991
Martin  [45] Aug. 30, 1983

[54] VARIABLE RESOLUTION, SINGLE ARRAY, INTERLACE INK JET PRINTER

[75] Inventor: Van C. Martin, Boulder, Colo.

[73] Assignee: International Business Machines Corporation, Armonk, N.Y.

[21] Appl. No.: 309,964

[22] Filed: Oct. 8, 1981

[51] Int. Cl.³ ............................................ G01D 15/18
[52] U.S. Cl. ...................................................... 346/75
[58] Field of Search ......................... 346/75, 103, 141

[56] References Cited

U.S. PATENT DOCUMENTS

| 4,063,254 | 12/1977 | Fox et al. | 346/75 |
| 4,069,486 | 1/1978 | Fox | 346/75 |
| 4,097,873 | 6/1978 | Martin | 346/75 |
| 4,232,324 | 11/1980 | Tsao | 346/75 |

Primary Examiner—Joseph W. Hartary
Assistant Examiner—Derek S. Jennings
Attorney, Agent, or Firm—Homer L. Knearl

[57] ABSTRACT

Multiple-resolution, interlace, ink-jet printing is accomplished using a single array with multiple nozzles by assuming a pseudo pel (picture element) spacing k' between the nozzles. The ratio between the old resolution and the new resolution is k'/k where k is the actual pel spacing between the nozzles. The print-data must be processed and the print head moved based on the pseudo pel spacing k'. The array of nozzles will still print in an interlace manner so long as k' and Nt (the total number of ink jet nozzles used) have no common factor.

10 Claims, 14 Drawing Figures

FAX 1

FAX 2 k=4
k'=3
Nt=8
R'=3/4 R

FAX 3

FAX 4

VARIABLE RESOLUTION, SINGLE ARRAY, INTERLACE INK JET PRINTER

FIELD OF THE INVENTION

This invention relates to interlace ink jet printers which may may be used as dot printers to print text or images. More particularly this invention relates to an improved single array ink jet nozzle system for variable resolution printing.

BACKGROUND OF THE INVENTION

A single array, interlace, ink jet nozzle system is taught in U.S. Pat. No. 4,069,486 entitled "Single Array Ink Jet Printer" and issued on Jan. 17, 1978, to S. J. Fox. This patent teaches the criteria for printing an interlace pattern with a single array of ink jet nozzles. Interlace pattern printing may be defined as printing adjacent lines, each line being one picture element (pel) wide, with print nozzles that are spaced more than one pel apart on the array.

To print interlace more than one pass of the print head across the media is required. Further to prevent overprinting of one line on top of another, the Fox patent teaches that the nozzles must be uniformly spaced k pels apart on the array and that the array must translate Nt pels perpendicular to the pass direction during each print pass. Nt is the number of nozzles on the array. Further, the Fox patent teaches that k and Nt must be integers and not have any common factors.

Mr. S. J. Fox and Mr. V. C. Martin, the present inventor, working together realized that multiple arrays of uniformly spaced ink jet nozzles could also be designed to print interlace patterns. The criteria for that design is taught in U.S. Pat. No. 4,063,254 entitled "Multiple Array Printer" issued on Dec. 13, 1977.

In applying interlace printers to communication print terminals, it became desirable to print more than one resolution, pels per inch or cm. Mr. Martin, in addressing this problem, invented a multiple array variable resolution printer which is the subject of U.S. Pat. No. 4,097,873 issued on June 27, 1978, and entitled "Ink Jet Printer For Selectively Printing Different Resolutions."

While this latter invention works very well, it does require more than one array to achieve the goal of variable resolution printing with a plurality of nozzles. Of course, the apparatus taught therein could be reduced to using a single nozzle on one array to perform variable resolution printing. However, this is not desirable because of the slow speed of such a printer and the wasteful and costly nature of building multiple arrays with multiple nozzles and then using only one nozzle for resolutions other than the standard resolution. From a system cost and optimum efficiency viewpoint, it would be most desirable to have an interlace ink jet printer having multiple nozzles on one array and being able to use substantially all the nozzles to print various resolutions.

SUMMARY OF THE INVENTION

The present invention uses a single array with multiple nozzles to print variable resolutions by assigning a psuedo k (hereinafter k') pel spacing to the uniform space between nozzles on the array when printing different resolutions. In other words, even though the array has an actual spacing of k pels between the nozzles the control system assumes the spacing is k' and adjusts the positional control of the array and the processing of data for printing as if the spacing were the new resolution, R', equals $(k'/k)R$, where R is the old resolution.

Viewed another way, the present invention recognizes first that the distance between nozzles must remain fixed and is equal to kD where D is the width of an actual pel spacing and k is the actual number of such pels between nozzles. Second, the fixed distance may also be defined as K'D' where D' is the width of a pseudo pel spacing and k' is the number of pseudo pels. Since kD must equal k'D', the new pel spacing width is given by the expression: $D'=(k'/k)D$, and $k'/k$ is the ratio of resolution change.

If the resolution is adjusted by using the psuedo pel spacing k', the translation motion of the array perpendicular to the pass direction must be adjusted. The relative motion of the array in the pass direction need not be adjusted but may be if, for example, substantially the same resolution is desired in both dimensions of the print document.

When implementing the present invention the criteria of the aforesaid Fox U.S. Pat. No. 4,069,486 must be observed. In other words, the actual spacing k between nozzles on the array must be uniform, and k' and Nt must be integers with no common factors. In the present invention the actual spacing k can be changed by printing with every "m"th nozzle. Thus k can be increased to mk where m is an integer. Of course, this reduces the total number of nozzles Nt used, but it also increases the number of discrete resolutions that may be selected since the expression for R' becomes: $R'=(k'/mk)R$.

With regard to k' and Nt having no common factors, it may be necessary to reduce Nt for some choices of k'. This can be done by not printing with one or more of the end nozzles on the array. For example, if k=4, Nt=9 and k' is chosen to be 3, then k' and Nt have a common factor. By not printing with one of the end nozzles, Nt becomes 8, and k' and Nt no longer have a common factor.

All of the features of the invention will become more apparent from the following description of preferred embodiments of the invention.

DETAILED DESCRIPTION

Figure 1A:
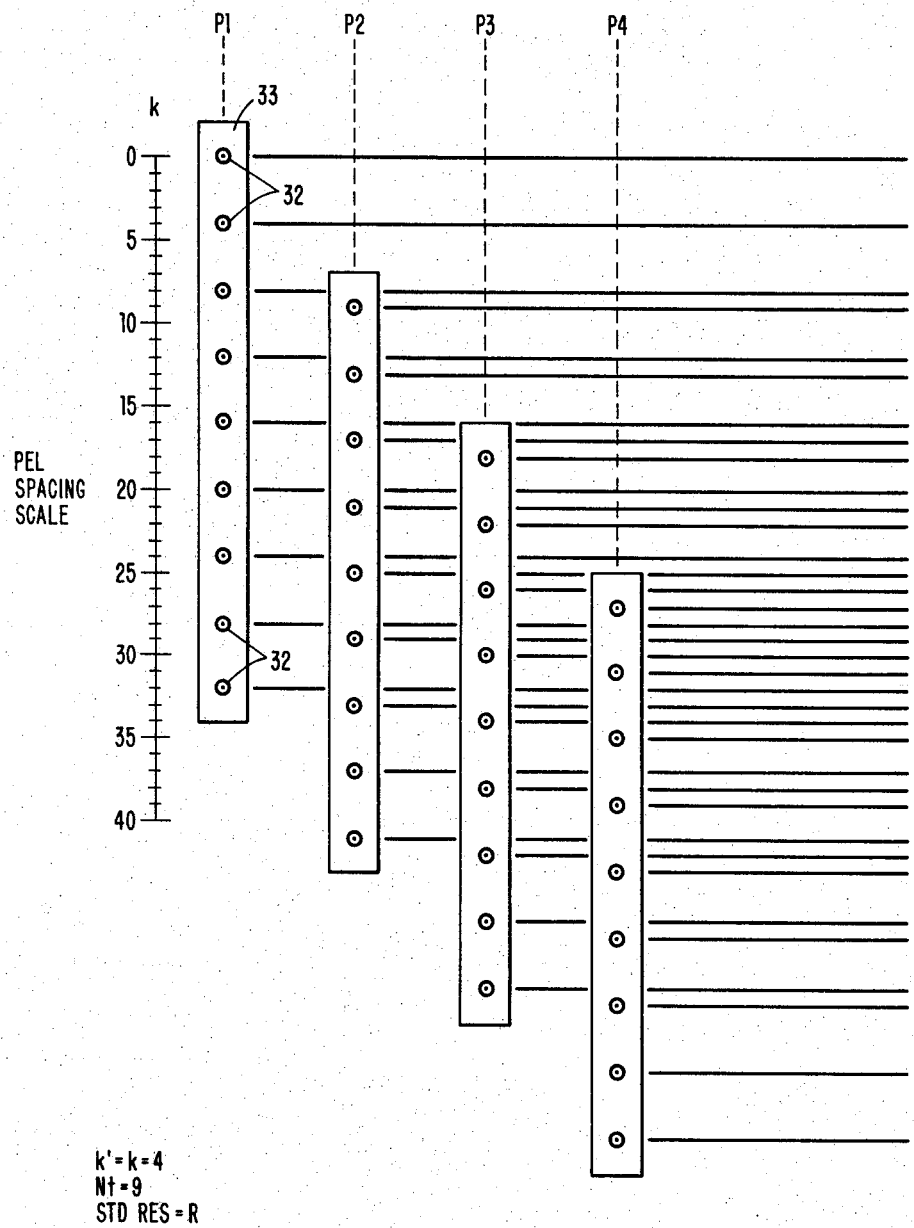
FIGS. 1A through 1E show multiple passes by a single array of ink jet nozzles to print standard resolution and other selected resolutions in an interlace manner.

The invention is most easily understood by referring to FIGS. 1A through 1E which show the relationship between actual pel spacing of the nozzles and pseudo pel spacing for the purpose of adjusting resolution. In all the examples a single array 33 of nine nozzles 32 is shown; however, some of the examples do not use all of the nozzles. The array 33 is shown in multiple positions P as necessary to do interlace printing. In FIG. 1A where k is 4, there are four positions P1 through P4 with each position indexed 9 pel spacings relative to the previous pass position. As a practical matter the array would follow a spiral path down the length of a print drum (FIG. 4), but for clarity of illustration FIGS. 1A-1E show a horizontal pass followed by vertical indexing.

Figure 1B:
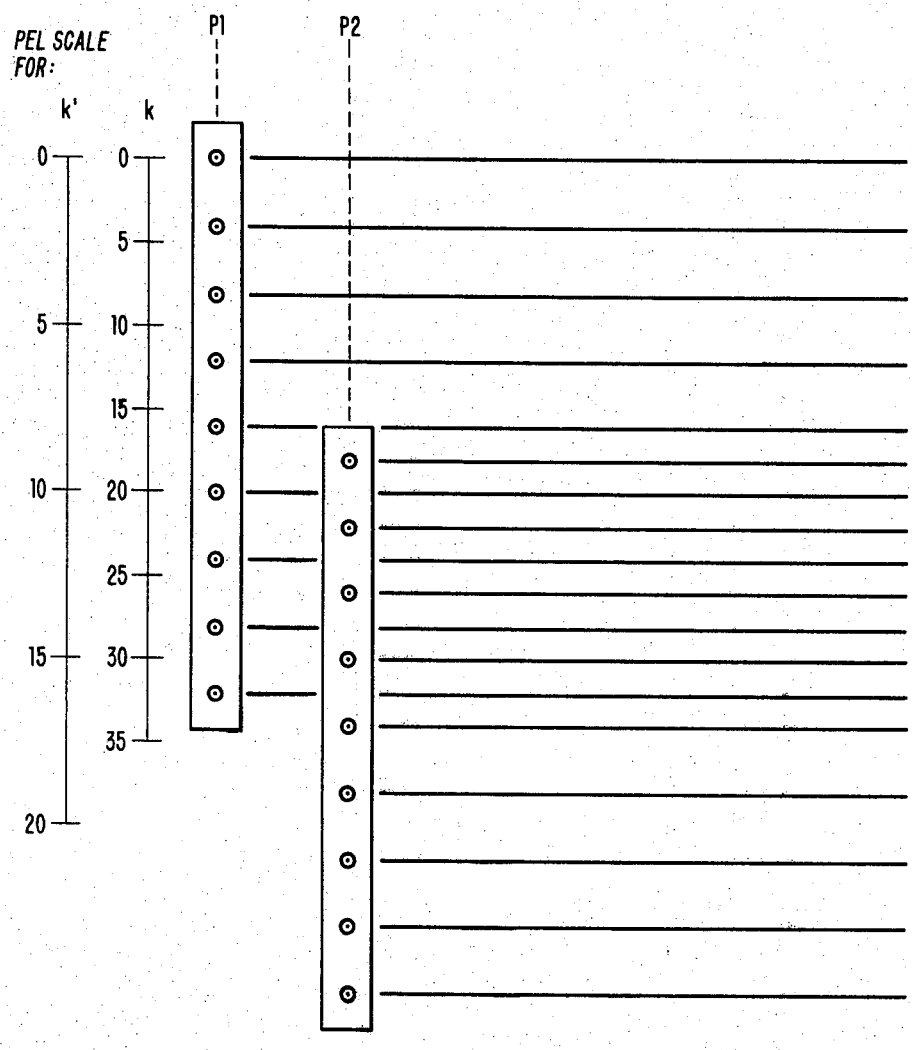

In FIG. 1A, standard resolution printing is shown. This figure is the reference for comparison to FIGS. 1B-1E to illustrate how variable resolution is achieved. In FIG. 1B, $k'$ is 2 so $R' = \frac{1}{2}R$. The k scale represents actual pel spacing between nozzles 32. The $k'$ scale assumes the pel spacing is two rather than four. Accordingly, the print pass lines are separated by 2 on the $k'$ scale and 4 on the k scale; i.e. the resolution vertically is halved. Also, the array must be indexed 9 on the $k'$ scale, and only to passes (P1 and P2) are necessary before full interlace printing occurs.

Figure 1C:
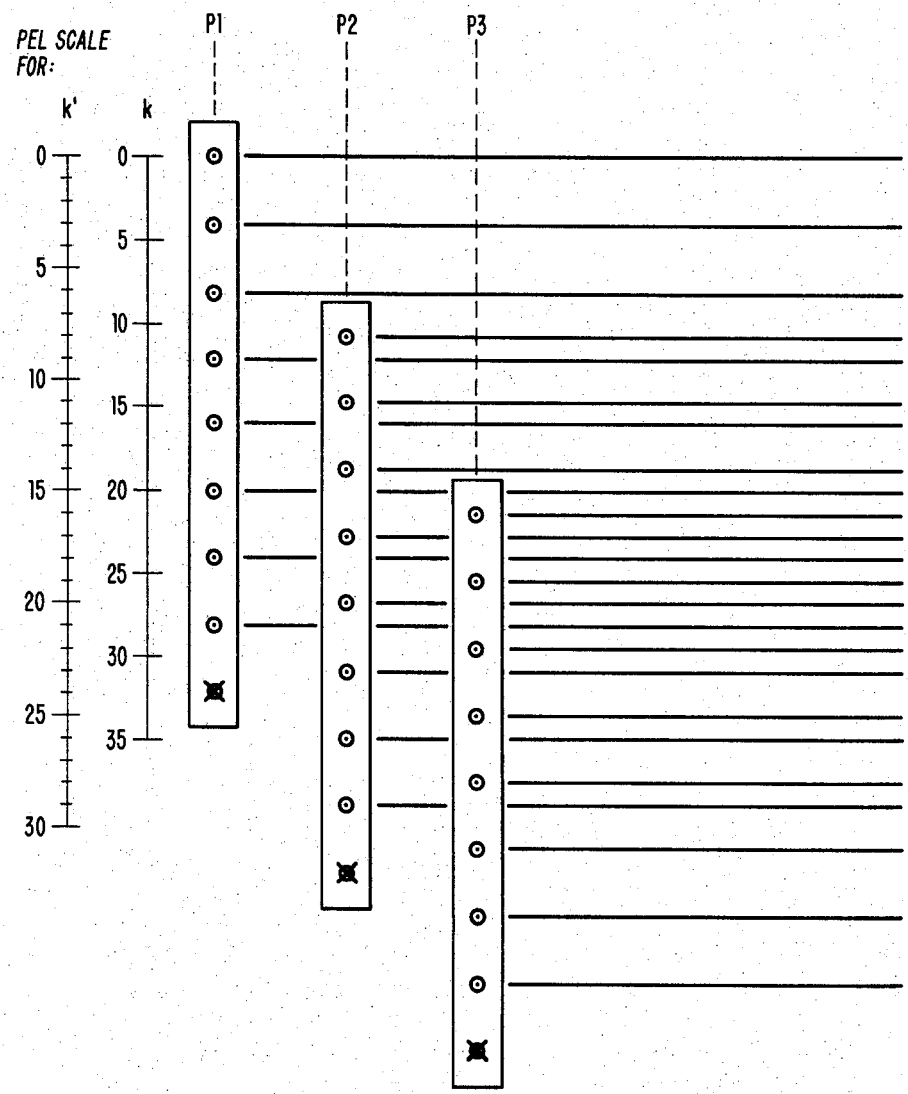
Figure 1D:
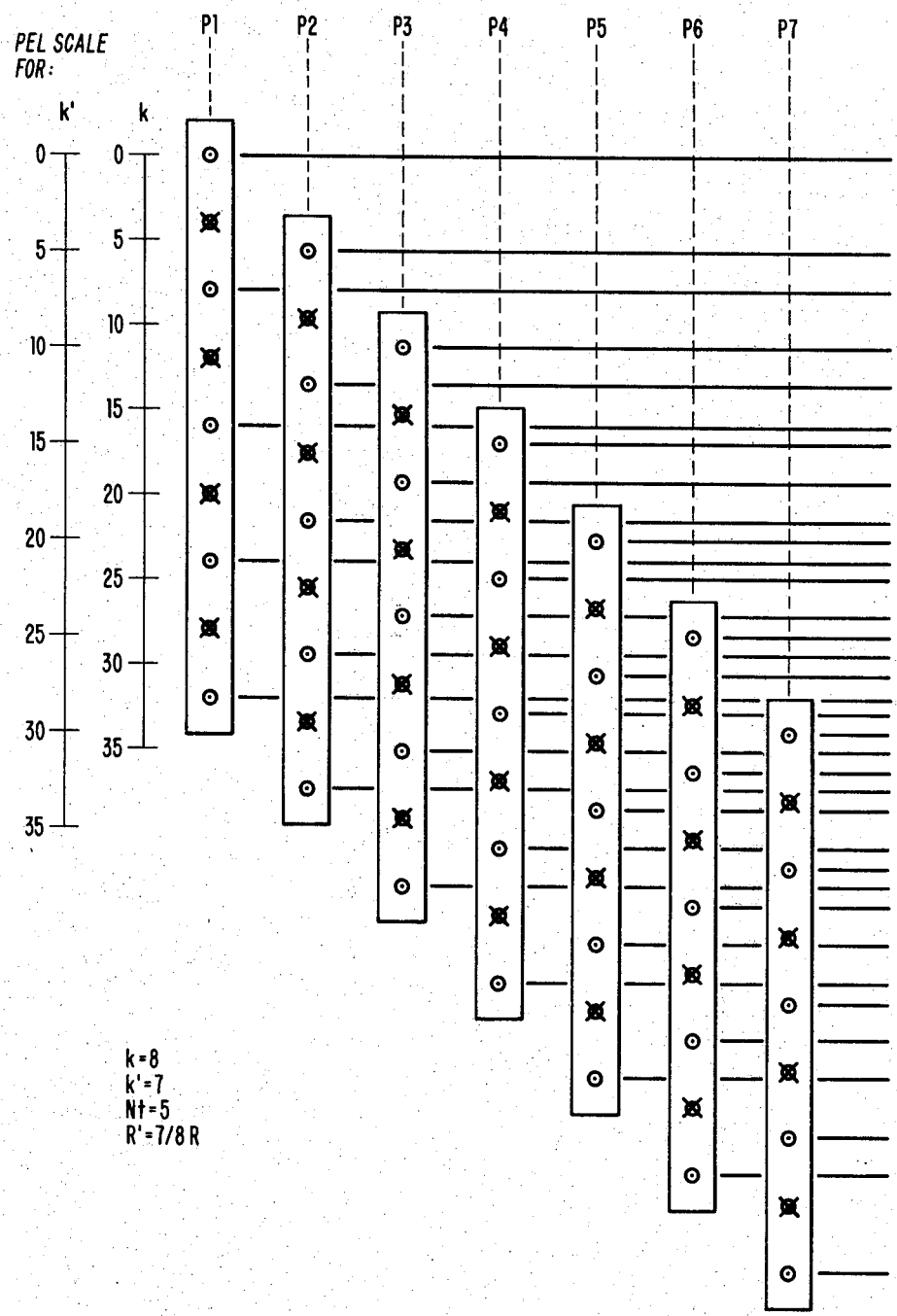
Figure 1E:
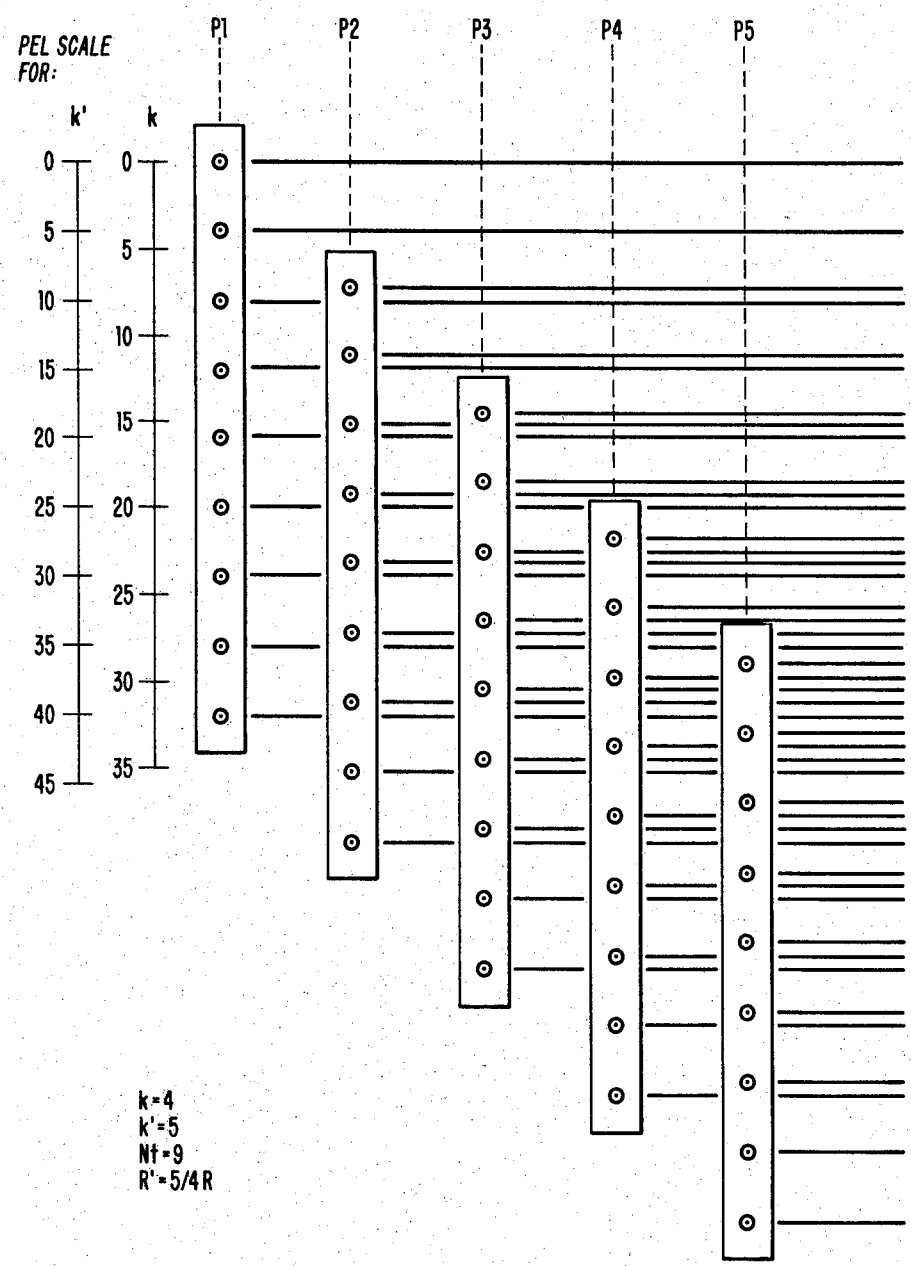

FAX4 mode resolution in FIG. 1E operates the same as FAX1 in FIG. 1A except that $k'$ is 5. Therefore, the $k'$ scale sets the pseudo pel spacing between nozzles to 5, and $R' = 5/4R$. The array must be indexed nine pseudo pel spaces on the $k'$ scale, and five passes (P1-P5) are necessary before full interlace printing begins.

FAX2 and FAX3 modes in FIGS. 1C and 1D are different from the other resolution modes in that not all the nozzles have been used. In FAX2, nozzle N9 (nozzles are numbered from top to bottom) is not used in order to satisfy interlace criteria that $k'$ and Nt not have a common factor. In FAX2, $k'$ is 3. N9 is not used in order to change Nt from 9 to 8. in FIG. 1C, the $k'$ scale uses three spacings between nozzles so the new resolution is $\frac{3}{4}$ of the standard resolution in FIG. 1A ($R' = \frac{3}{4}R$). Since $k'$ is three, there are three passes by the array before full interlace printing begins. Since Nt has changed to 8, the array is indexed 8 spaces on the $k'$ scale between passes.

In FIG. 1D, FAX3 mode uses every second nozzle so that k is changed from 4 to 8. This allows resolution increments of eighths rather than fourths as described in FIGS. 1B, 1C and 1D. With $k'$ chosen to be 7 in FIG. 1D, the new resolution becomes $\frac{7}{8}$ of the standard resolution. Since $k'=7$, seven passes (P1-P7) are required before full interlace printing begins. Also, Nt has changed from nine to five because only every other nozzle is used. Accordingly, the array must be indexed five spaces on the $k'$ scale between passes.

While this illustrative embodiment of the invention assumes an array having 9 nozzles spaced 4 actual pel spacings apart, an infinite number of single array multiple nozzle arrangements might be chosen. It is only necessary to follow the interlace criteria as described in the aforesaid Fox patent when choosing the standard configuration using actual pel spacing and other resolution modes using pseudo pel spacing.

The invention has been implemented by making improvements to the apparatus described in the aforesaid Martin U.S. Pat. No. 4,097,873. Accordingly, the preferred embodiment of the invention is described in the environment of a facsimile system; however, it will be apparent to one skilled in the art that the invention is equally applicable to a printer as well as a copier/facsimile terminal.

Figure 2:
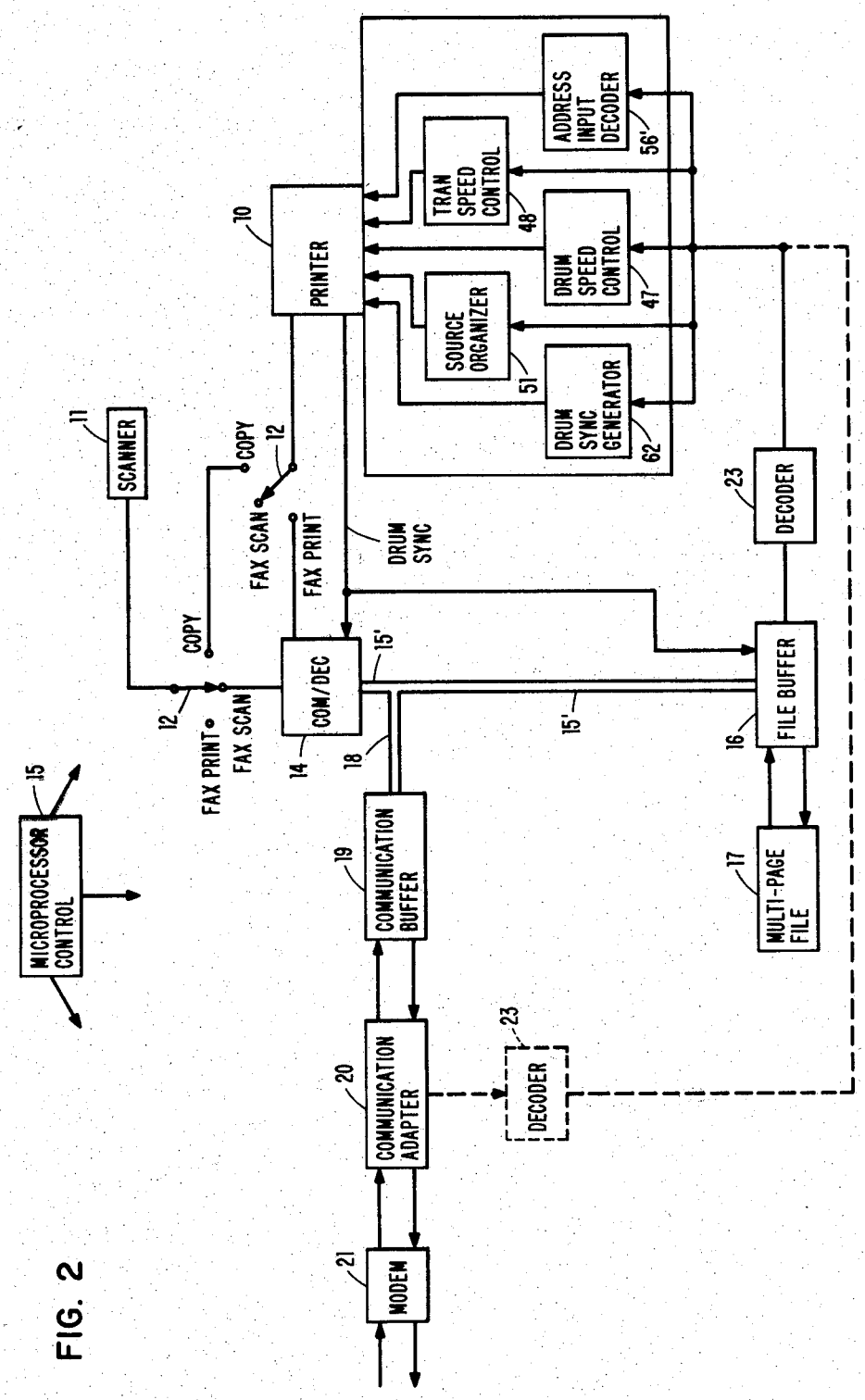
FIG. 2 is an overview of a facsimile terminal and copier designed in accordance with the present invention to print at selectable resolutions.

Referring now to FIG. 2, there is shown an ink jet printer 10 having a document scanner 11 connected thereto by a switch 12 when the printer 10 prints at a standard resolution from the scanner 11. Switch 12 is electronically controlled but is shown schematically as a mechanical switch.

When the scanner 11 is scanning a document during a facsimile resolution scan, the switch 12 connects the scanner 11 with a compress/decompress algorithm 14. At this time, the printer 10 is not connected to the compress/decompress algorithm or to the scanner 11.

During printing in a facsimile mode resolution, the switch 12 connects the compress/decompress algorithm 14 with the printer 10. At this time, the scanner 11 is not connected to the compress/decompress algorithm 14 or the printer 10.

The position of the switch 12 is controlled through a microprocessor control 15, which controls all of the operations when the printer 10 or the scanner 11 is connected to the compress/decompress algorithm 14. One suitable example of the microprocessor control 15 is sold as Model 6800 by Motorola.

The compress/decompress algorithm 14 may consist of run length coding, for example. The compress/decompress algorithm 14 is used to compress data, which is obtained from the document scanner 11, prior to its being supplied over a data bus 15', which can comprise eight lines for a byte, for example, to a file buffer 16. For example, only the start and stop positions for a white or black portion is supplied to the file buffer 16.

The file buffer 16 loads a multi-page file 17. One example of the multi-page file 17 is a disk file. The flow of data from the scanner 11 to the compress/decompress algorithm 14 and then to the file buffer 16 is controlled by the microprocessor control 15.

After all of the data concerning the document being scanned by the scanner 11 has been obtained and stored in the multi-page file 17, the microprocessor control 15 causes the stored data to be removed from the multi-page file 17 over a portion of the data bus 15' and a data bus 18, which can comprise eight lines for a byte, for example, to a communication buffer 19, which could be a random access memory or registers. The communication buffer 19 must hold enough data to keep the communication line over which the data is being transmitted busy.

The communication buffer 19 is connected to a communication adapter 20. The communication adapter 20 controls the supply of data from the communication buffer 19 through a modem 21. When transmitting data from the communication buffer 19, the modem 21 functions as a modulator. When receiving data, the modem 21 functions as a demodulator.

The output from the modem 21 is transmitted over a communication line such as a telephone line, for example, to another device of the same type as shown in FIG. 2. Accordingly, the reception of the data will now be discussed with respect to FIG. 2 as if FIG. 2 is receiving the data. Thus, the modem 21 functions as a demodulator for the data received from the scanner 11 at the remote location.

The data is supplied from the communication adapter 20 to the communication buffer 19 and then over the data bus 18 and a portion of the data bus 15' to the file buffer 16. Then, the received data in the file buffer 16 is stored in the multi-page file 17. When all of the data has been transmitted by the communication adapter 20, the microprocessor control 15 receives a signal from the communication adapter 20 to indicate this. Then, the microprocessor control 15 insures that the switch 12 connects the compress/decompress algorithm 14 to the printer 10 prior to transmitting data from the multi-page file 17 to the printer 10. The switch 12 does not connect the scanner 11 to the compress/decompress algorithm 14 at this time.

The data in the multi-page file 17 includes fax (facsimile) mode data that indicates the facsimile resolution at which the data was obtained from the scanner 11 at the remote location. This data is transmitted to a decoder 23.

The decoder 23 decodes the fax mode data to determine which of the fax modes that the printer 10 is to operate in when the data, which is stored in the multipage file 17, is supplied to the printer 10. All of the fax modes have a different resolution than when the printer 10 is connected to the scanner 11 to function as an ink jet copier. If there is no fax mode data being supplied to the decoder 23, the decoder 23 provides an output for a standard resolution, which is when the scanner 11 is connected to the printer 10 by the switch 12.

At the time that data is transmitted from the multi-page file 17 to the printer 10, the signals from the decoder 23 to the printer 10 cause it to print at the desired facsimile resolution. This is the fax mode resolution at which the data has been obtained from the scanner 11 at the remote location.

Figure 3:
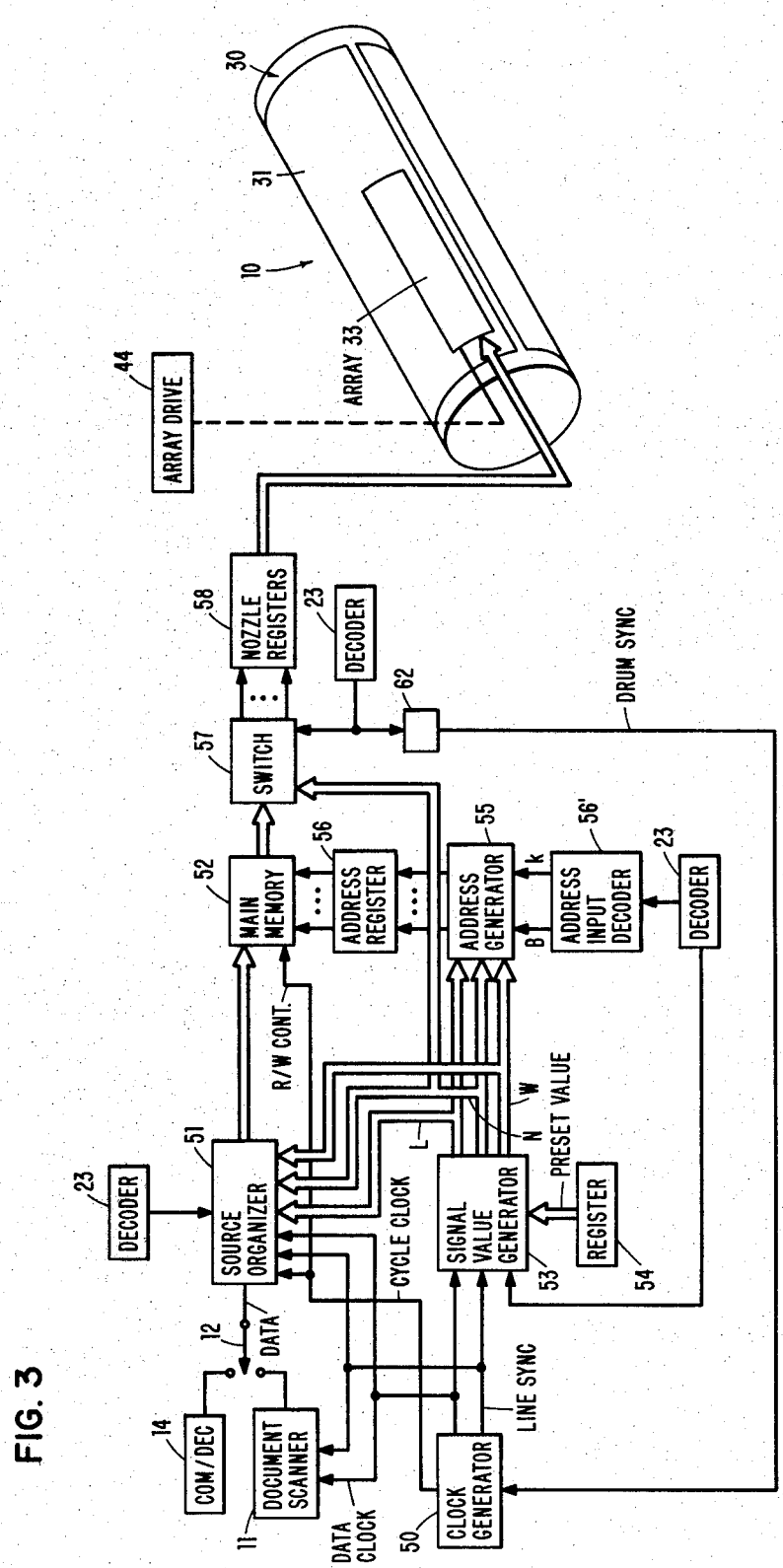
FIG. 3 shows the print-data processing apparatus that prepares the print-data for interlace printing at selected print resolutions.

Referring now to FIG. 3, the print-data processing apparatus includes apparatus to organize the data into segments for printing, a main memory for buffering the print-data and address generating controls for directing the buffered print-data to the correct nozzle. As will be described hereinafter, the print-data processing apparatus prepares the data for printing on scan lines which are separated by a pseudo pel spacing D' by using the psuedo pel spacing scale k' when processing the print-data.

Figure 4:
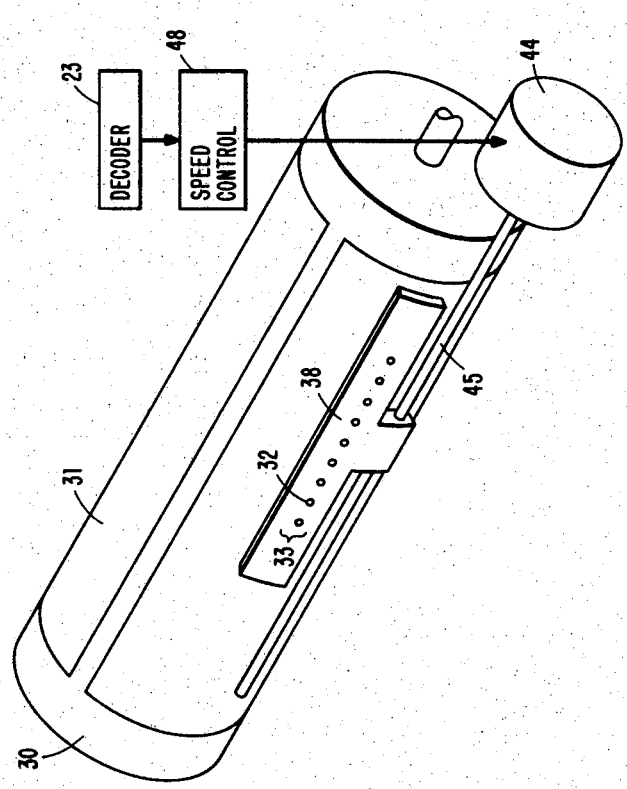
FIG. 4 shows a single array of nine nozzles controlled to translate along the length of the print drum.

As shown in FIG. 3, the printer 10 includes a cylindrical drum 30 having a medium 31 supported thereon to receive ink from jet nozzles 32 (see FIG. 4). The ink jet nozzles 32 are arranged in a single array 33 with nozzles 32 equally spaced from each other in a line. The spacing between nozzles 32 is made in accord with the arrangement shown and described in the aforesaid Fox U.S. Pat. No. 4,069,486.

It should be understood that the ink jet nozzles 32 are shown schematically supported on the array support 38. The details of the ink jet nozzles 32 and the associated control mechanisms, have been omitted since conventional ink jet nozzles and associated mechanisms may be employed with this invention. The ink jets may be the continuous flow type or the drop-on-demand type.

The array support 38 is driven by an array drive motor 44 (see FIG. 4) in an axial direction parallel to the axis of the drum 30. The motor 44 drives a lead screw 45, which has the array support 38 mounted thereon so that rotation of the lead screw 45 is transferred into linear motion of the array support 38 in a direction parallel to the axis of the drum 30.

Figure 5:
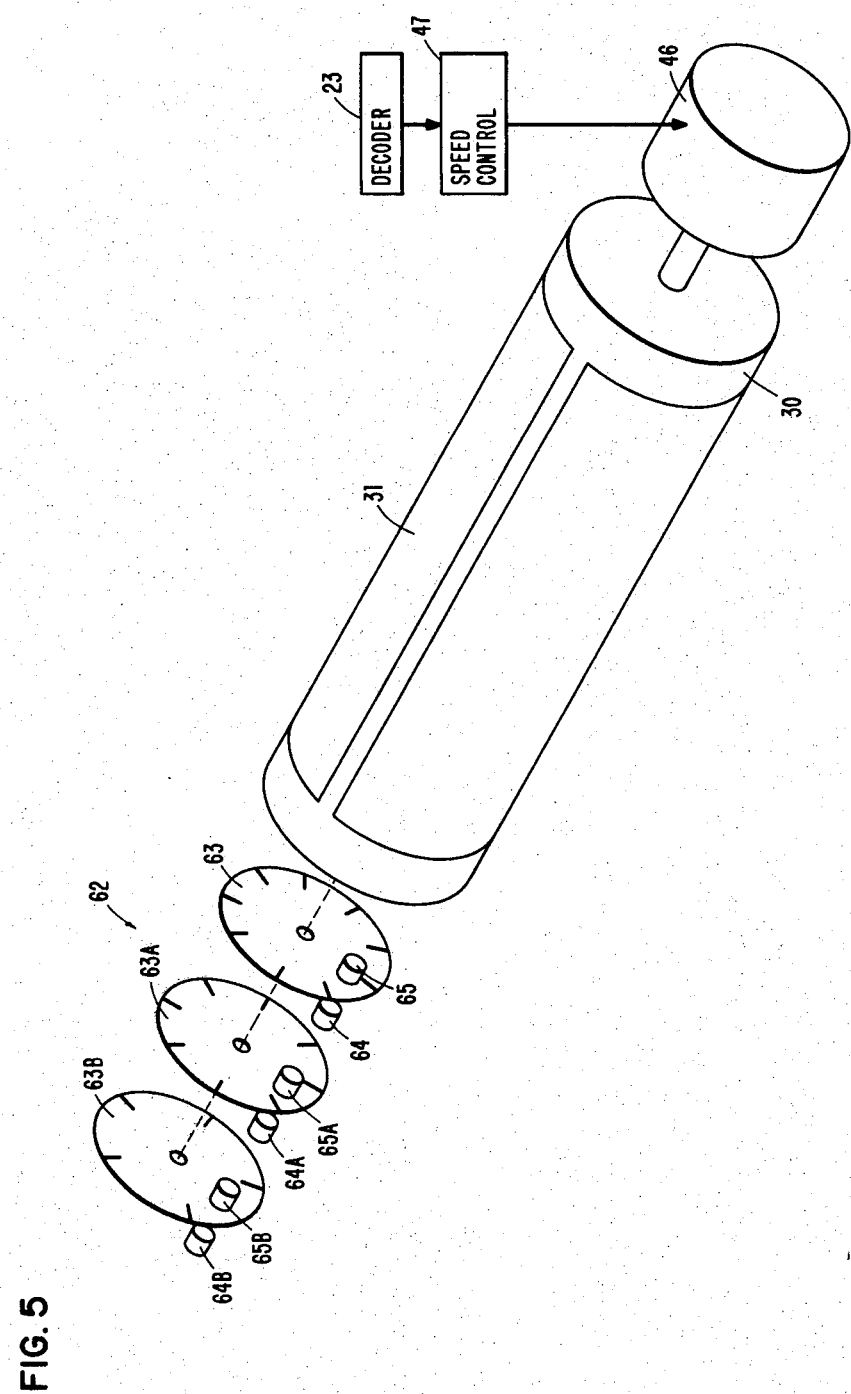
FIG. 5 shows the control of the drum speed and the generation of the drum sync signals.

The drum 30 is supported for rotation about its axis by suitable structure (not shown). The drum 30 is rotated by a drum motor 46 (see FIG. 5). The rate of rotation of the motor 46 is controlled by a speed control 47 (see FIGS. 2 and 5) which selects the speed of the motor 46 in accordance with whether the standard resolution, which is when the printer 10 is connected to the scanner 11 by the switch 12 so that the device functions as an ink jet copier, is to be used or one of the fax resolutions is to be employed. The speed control 47 receives its signal from the decoder 23 as shown in FIGS. 2 and 5.

Similarly, a speed control 48 (see FIGS. 2 and 4) is connected to the array drive motor 44 to govern its speed of rotation. The speed of rotation of the motor 44 is selected in accordance with a signal from the decoder 23 as to whether the standard resolution or one of the fax resolutions is to be utilized in printing.

Also, source organizer 51 (See FIGS. 2, 3 and 6) receives a control signal from decoder 23. The source organizer arranges the data for interlace printing. Depending upon the resolution used in printing, the number of nozzles changes and the nozzles used may change. Accordingly the size of the print-data word may change and its storage location in memory will be changed by the source organizer depending upon the fax resolution decoded by decoder 23. The details of the source organizer are described hereinafter with reference to FIG. 6.

Figure 10:
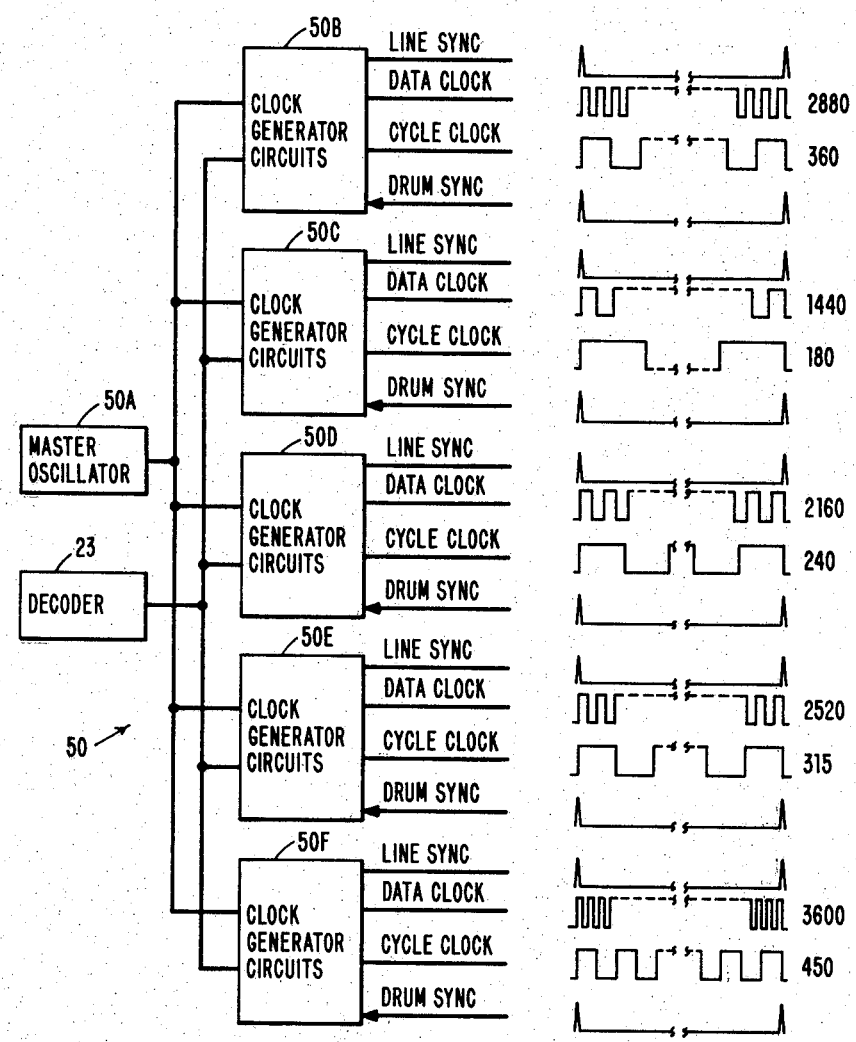
FIG. 10 shows the clock generator 50 of FIG. 3.

The printer 10 includes circuitry similar to that shown and described in the aforesaid Fox Patent with modifications for the printer 10 to be operated at the various fax resolutions. Thus, the printer 10 includes a clock signal generator 50 (see FIG. 3), which applies the same signals as are supplied by the clock generator in the aforesaid Fox Patent. That is, the clock generator 50 supplies a line sync, a data clock, an array clock, and a cycle clock with all being controlled in response to a drum sync signal. However, the number of the data clock pulses, the array clock pulses, and the cycle clock pulses for each drum sync for a fax mode resolution is different than when printing is occurring at the standard resolution. The relationship of these clock signals is shown in FIG. 10.

The clock generator 50 includes a master oscillator 50A connected to clock generator circuits 50B, clock generator circuits 50C, clock generator circuits 50D, clock generator circuits 50E, and clock generator circuits 50F. Only one of the clock generator circuits 50B, 50C, 50D, 50E, and 50F is selected for a specific resolution at which the printer 10 is to print. This specific resolution is determined by the decoder 23, which has its output connected to each of the clock generator circuits 50B, 50C, 50D, 50E, and 50F.

The clock generator circuit 50B produces the various clock signals for the standard resolution while the clock generator circuits 50C, 50D, 50E, and 50F produce the clock pulses for various different fax mode resolutions. In the same manner as described in the aforesaid Fox Patent, it should be understood that each of the clock generator circuits 50B, 50C, 50D, 50E, and 50F will include counting circuits, logic circuits, differentiators, and integrators for operating on the pulses from the master oscillator 50A to provide the various types of outputs illustrated in FIG. 10.

As shown in FIG. 3, the clock generator 50 supplies two clock signals, data clock and line sync, to the scanner 11 and all three of the clock signals, data clock, cycle clock and line sync, to source organizer 51. The source organizer 51 is connected through the switch 12 to receive data either from the scanner 11 or from the compress/decompress algorithm 14.

It should be understood that the compress/decompress algorithm 14 could be omitted but this would cause information to be transmitted at a slower rate. If the compress/decompress algorithm 14 is omitted, then the switch 12 could be connected directly to the communication buffer 19 during a document scan (FIG. 2).

The source organizer 51 has two memory areas with each storing successive lines of data from the scanner 11 or the compress/decompress algorithm 14 in accordance with the position of the switch 12. When the data is being stored in one of the memory areas of the source organizer 51, the data in the other memory area of the source organizer 51 is being selectively supplied to a main memory 52.

The source organizer 51 receives all three clock signals provided by the clock generator 50. Thus, in addition to the data clock and line sync signals, which also are applied to the document scanner 11, the source organizer 51 receives a cycle clock signal from the clock generator 50. The frequency of the clock signals generated by the clock generator 50 are in accordance with the resolution, either standard or facsimile.

The source organizer 51 also receives three additional signals from a signal value generator 53. The three signals received by the source organizer 51 from the input signal value generator 53 are a line value L, a nozzle value N, and a word value W. The magnitudes of L, N, and W are different for the standard resolution and for each of the fax resolutions. Thus, the selected resolution determines the values of each of these three signals.

In addition to receiving signals indicating whether the printer 10 is to operate in its standard resolution or one of the fax mode reevolutions, the signal value generator 53 also receives the line sync and data clock signals from the clock generator 50 in accordance with the selected resolution and a preset value stored in a register 54. The content of the register 54 represents misalignment of the medium 31 with respect to the drum 30 on which and with with respect to which the image is generated. If no misalignment is present, the value stored in the register 54 is zero.

Figure 7:
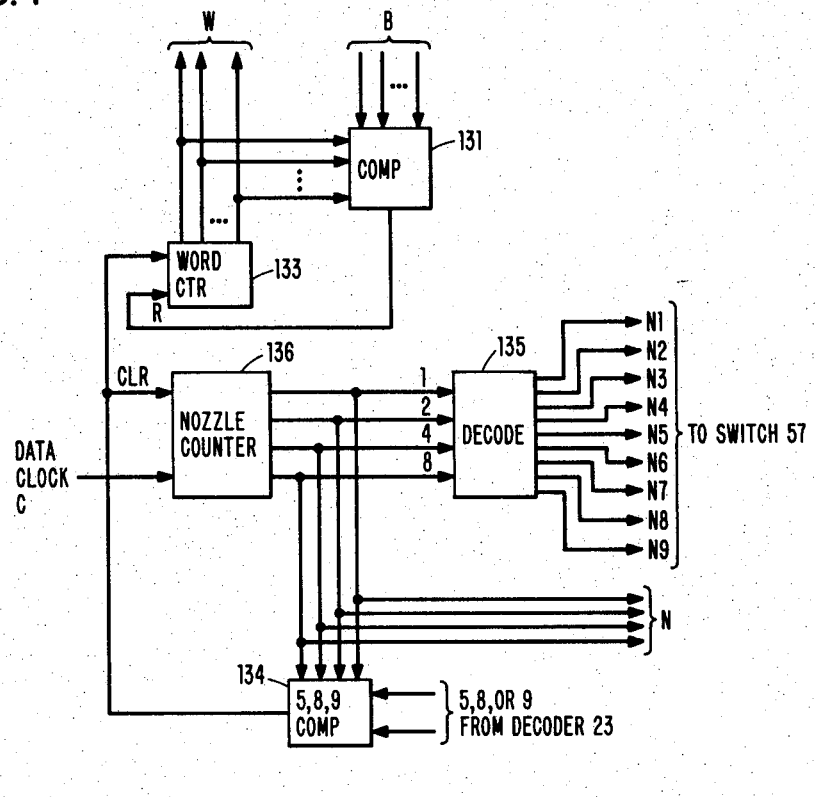
FIG. 7 shows the details of the signal value generator 53 in FIG. 3.
Figure 7:
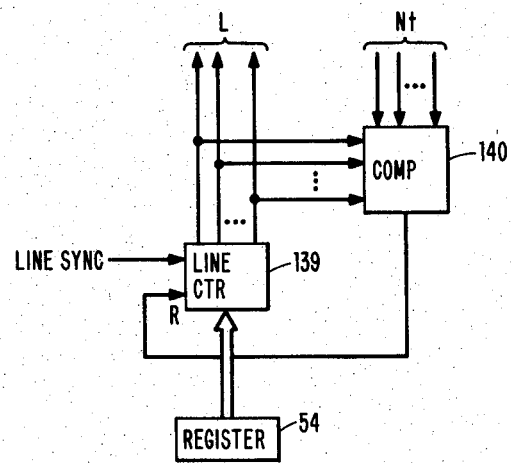
Figure 8:
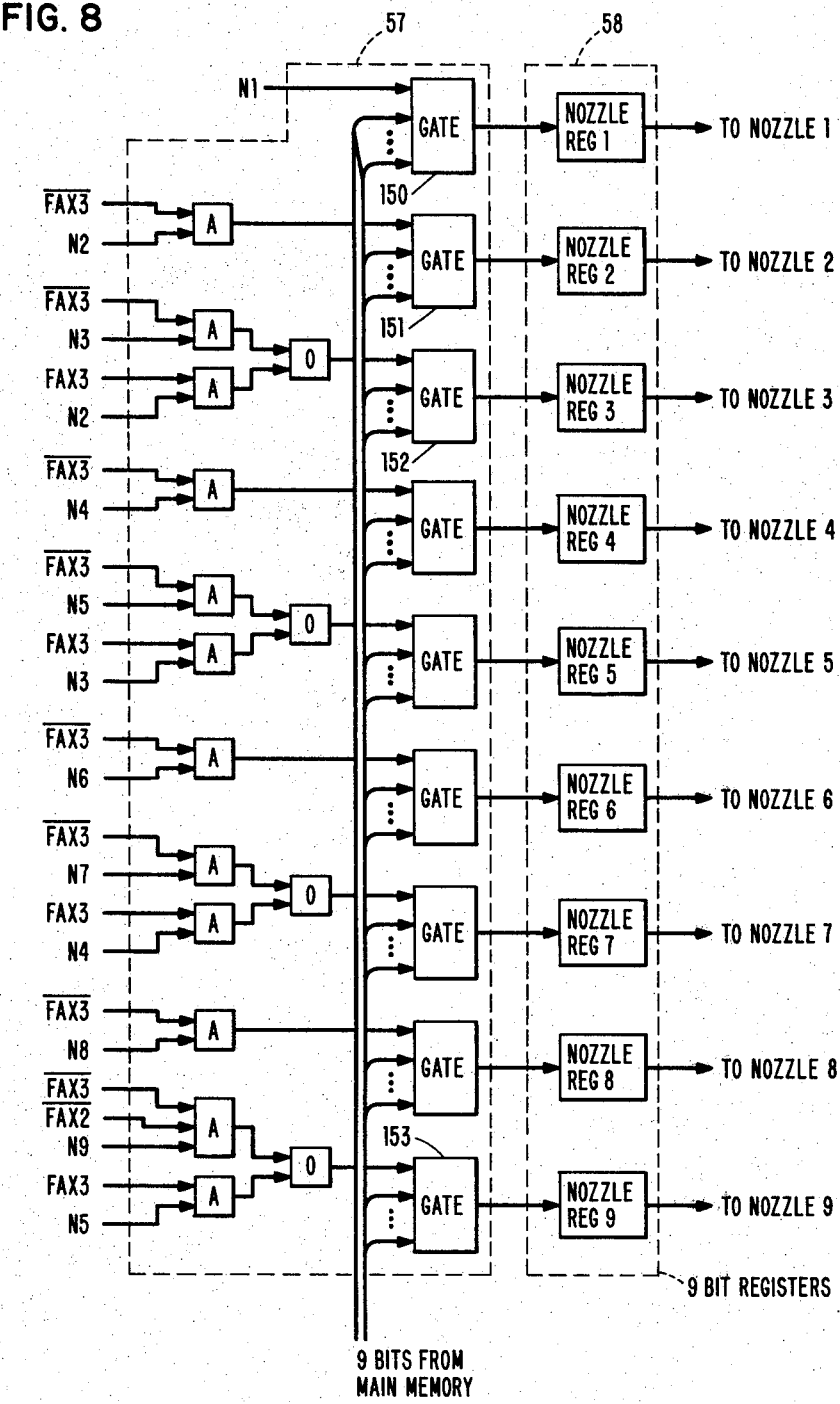
FIG. 8 shows the details of switch 57 and nozzle registers 58 in FIG. 3.

As shown in FIG. 7, the signal value generator uses counters to generate L, N, and W. Nozzle counter 136 is advanced by the Data Clock. It is reset by compare 134 to zero each time it reaches a count equal to Nt. Compare 134 compares the nozzle count to Nt which is received from decoder 23. Decoder 135 monitors the nozzle count and raises one output line N1-N9 indicating the active nozzle to switch 57 (FIGS. 3 and 8).

The reset for nozzle counter 136 is the increment count signal for word counter 133. The word counter is reset to zero by comparator 131 which compares the word count W to B, the number of words per print segment. Each time a segment is filled the word counter is reset to zero and begins counting words in the next segment.

The line counter 139 is incremented by the line sync pulse. It is reset to zero by comparator 140 that compares the line count to Nt. The number of line sync pulses from line sync generator 62 (FIG. 5) in one revolution of drum 30 is chosen to equal Nt. Thus, the count L from counter 139 is the scan line count modulo Nt.

The stored data in the source organizer 51 is supplied to a storage location in the main memory 52 in accordance with an address from an address generator 55. The address generator 55 supplies the address to an address register 56 in accordance with the algorithm main memory address as follows:

$$address = B(L\ MOD(k'N+dL)) + dN + W$$

where L is the scan line number, MOD means modulo, i.e., translating to the number base $(k'N+dL)$, N is the nozzle number of the nozzle 32 within the array, k' is the psuedo nozzle spacing within the nozzle array expressed in integer pels, dL is the number of scan lines of data stored before the first nozzle begins to print and and this is zero in this application, B is the number of memory words per segment, dN is the first address in the memory allocated to the nozzle number N and is given by the expression:

$$dN = BN((k'/2)(N-1)+dL),$$

and W is the word value (modulo B). It should be understood that $Lmod(K'N+dL)$ requires an independent counter (not shown) for each nozzle. The dN values can be stored in a read only memory within the address generator 55.

The address generator 55 supplies the address to the address register 56 in accordance with the magnitudes of the L, N, and W signals, produced by the signal value generator 53, and the magnitudes of the signals B and k' from an address input decoder 56'. The address input decoder 56' is controlled by signals from the decoder 23. Thus, the output of the address input decoder 56' depends upon the selected fax mode resolution or the standard resolution. By inserting the output of the address generator 55 in the address register 56, the address register 56 controls the location within the main memory 52 in which the data from the source organizer 51 is inserted.

The stored data in the main memory 52 is applied one word at a time by a switch 57 and an array 58 of registers to the ink jet nozzles 32. The switch 57 is under the control of the magnitude of the nozzle value N from the signal value generator 53 and the resolution mode from decoder 23. Switch 57 and registers 58 are described hereinafter in more detail with reference to FIG. 8.

Accordingly, the stored signals in the main memory 52 control the deposition of ink through the ink jet nozzles 32 on the medium 31. Since the array support 38 is driven axially by the motor 44 while the drum 30 is rotated by the motor 46 (see FIG. 5), each of the nozzles 32 produces a spiral about the medium 31 on the drum 30. As the nozzle 32 produces the spiral, ink is either applied at each segment from the particular nozzle or not depending on the input from the stored data in the main memory 52.

The clock generator 50 (see FIG. 3) supplies a read/write control signal to the main memory 52 to cause read and write cycles to continuously occur in the main memory 52. The read/write control signal from the clock generator 50 is the cycle clock with its frequency being determined by the selected resolution. The read control signal occurs when the cycle clock is up, and the write control signal occurs when the cycle clock is down. It is necessary for the read cycle to occur first so that useful data is not destroyed by overwriting.

During each read cycle, each memory address, which is generated by the address generator 55, reads data from the main memory 52 through the switch 57 to the array 33. Upon completion of the read cycle, new image information is stored in the main memory 52 during a write cycle in accordance with the address supplied from the address generator 55.

A drum sync signal is applied from a drum sync generator 62 to the clock generator 50, the compress/decompress 14 (see FIG. 2), and the file buffer 16. This prevents underruns and overruns of the data in the main memory 52 so as to produce the required amount of storage.

The drum sync generator 62 includes a first disc 63 (see FIG. 5) having scribed transparent lines therein arranged around the periphery of the disc 63. The number of the transparent lines is equal to the number of the nozzles 32 in the array 33. Thus, there would be a total of nine scribed transparent lines on the disc 63 in the example shown.

The drum sync generator 62 also includes a second disc 63A having scribed transparent lines therein arranged around the periphery of the disc 63A. The number of transparent lines is equal to the total number of nozzles used when $k'=3$. Thus, there would be a total of eight transparent lines on the disc 63A in the example shown.

The drum sync generator 62 also includes a third disc 63B having scribed transparent lines therein arranged around the periphery of the disc 63B. The number of transparent lines is equal to the total number of the nozzles used when $k'=7$. Thus, there would be a total of five transparent lines on the disc 63B in the example shown.

The discs 63, 63A and 63B are attached to the drum 31 for rotation therewith. The discs 63 rotates between a light sources 64 and a detectors 65, which produces the drum sync signals whenever the light source 64 is detected thereby. The signals from the detectors 65, 65A and 65B are selected in accordance with whether the standard resolution or one of the fax mode resolutions is to be used.

Table I gives the total number of nozzles, Nt, the actual pel spacing, k, the pseudo pel spacing k', the data organization and the clock frequencies used for the various print resolutions described herein.

TABLE I

| | | STD | FAX1 | FAX2 | FAX3 | FAX4 |
|---|---|---|---|---|---|---|
| 640 | Nt | 9 | 9 | 8 | 5 | 9 |
| | k | 4 | 4 | 4 | 8 | 4 |
| | k' | 4 | 2 | 3 | 7 | 5 |
| | Resolution (pels/inch) | 240 | 120 | 180 | 210 | 300 |
| | (pels/cm) | 94 | 47 | 71 | 83 | 118 |
| 645 | C (Data Clock Pulses or Bits/Scan Line) | 2880 | 1440 | 2160 | 2520 | 3600 |
| 650 | H (Bits/Source-Org. Addr.) | 8 | 8 | 9 | 8 | 8 |
| 655 | S = C/H (Source-Org. Addresses; Memory Cycles/ Scan Line) | 360 | 180 | 240 | 315 | 450 |
| | b = C/Nt (Bits/Segment) | 320 | 160 | 270 | 504 | 400 |
| 660 | G (Bits/Word) | 8 | 8 | 9 | 8 | 8 |
| | B = b/G | 40 | 20 | 30 | 63 | 50 |

TABLE I-continued

| | STD | FAX1 | FAX2 | FAX3 | FAX4 |
|---|---|---|---|---|---|
| (Mem. Words/ Segment) | | | | | |

Figure 6:
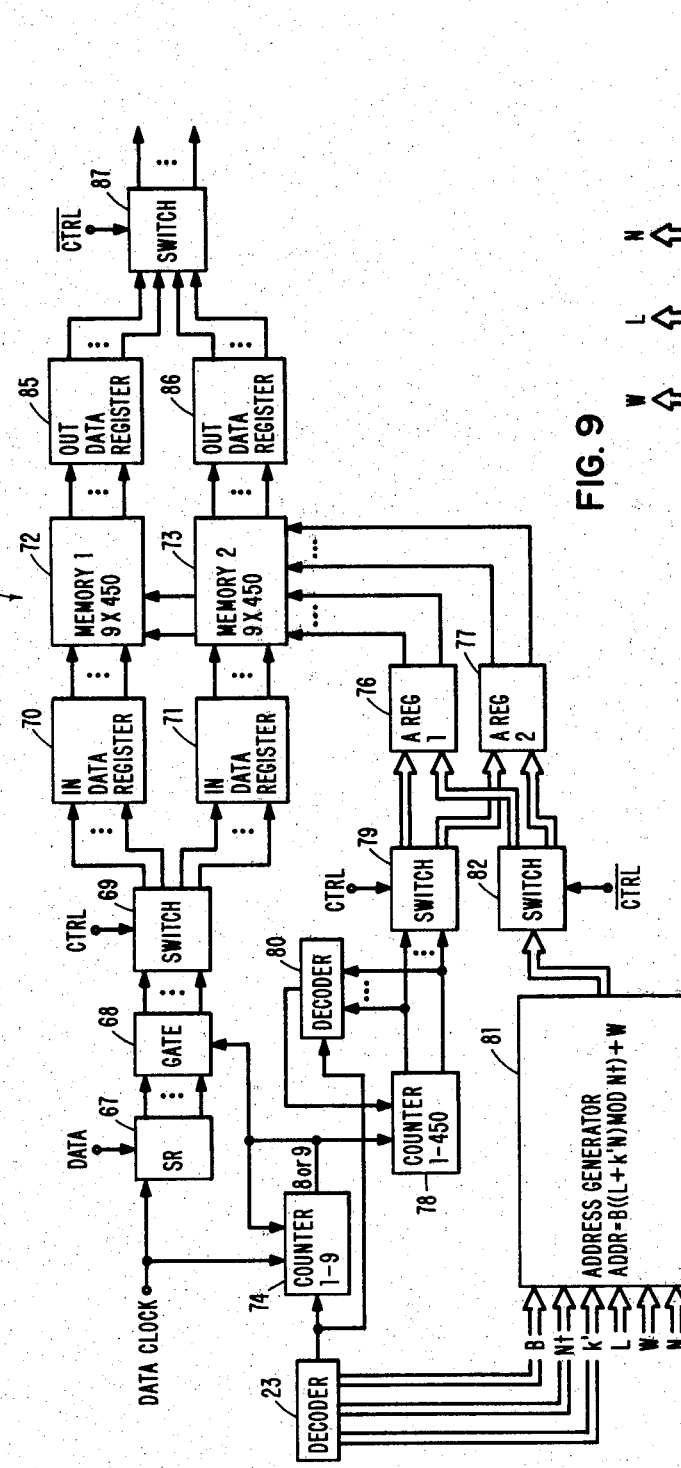
FIG. 6 shows the details of the source organizer 51 in FIG. 3.
Figure 9:
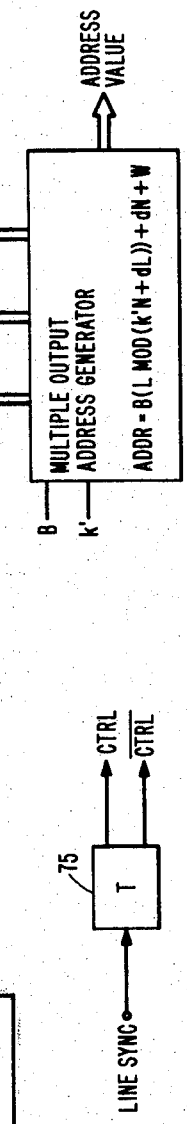
FIG. 9 is the address generator 55 of FIG. 2.

As shown in FIG. 6, the source organizer 51 includes a shift register 67 having data signals supplied thereto from either the scanner 11 or from the compress/decompress 14 depending on the position of the switch 12. These signals are shifted in the shift register 67 under control of the data clock signal from the clock signal generator 50.

The shift register 67 stores nine bits and has nine parallel outputs, which are applied by a gate 68 and a switch 69 to one or the other of two input data registers 70 and 71. The input data registers 70 and 71 are associated with random access memories 72 and 73, respectively.

In addition to the data clock signals being supplied from the clock generator 50 to the shift register 67 to control the data signals shifted thereinto, the data clock signals also are applied to a one-nine counter 74, which provides a signal to enable the gate 68 and reset the counter 74 at each count of eight or nine depending on the resolution to be printed. During a standard resolution and any FAX resolution except FAX2, the counter 7 counts to eight and then produces a signal to enable the gate 68 and reset the counter 74. During the FAX2 mode resolution, the counter 74 counts to nine before providing a signal to enable the gate 68 and reset the counter 74.

The counter 74 receives an input from the decoder 23 to determine whether the counter 74 counts to eight or nine before producing an output signal to enable the gate 68 and reset the counter 74. Thus, only the first eight bits of the shift register 67 have meaningful data during all resolutions except FAX2 while all nine bits of the shift register 67 contain useful information during FAX2 mode resolution. The enabling of the gate 68 applies the contents of the shift register 67 in parallel to the switch 69, which causes the contents of the shift register 67 to be applied to one of the input data registers 70 and 71.

The switch 69 has a control signal, which is generated by a trigger 75, applied thereto to determine which of the input data registers 70 and 71 receives the data from the shift register 67. The trigger 75 receives the line sync signal from one of the clock generator circuits 50B, 50C, 50D, 50E, and 50F (see FIG. 10) of the clock generator 50 in accordance with the resolution to be printed so that the trigger 75 (see FIG. 6) changes state with each line sync signal. Thus, during one scan line period, the contents of the shift register 67 are applied serially nine bits in parallel to the input data register 70. During the next scan line period, the contents of the shift register 67 are similarly applied to the input data register 71.

While all nine bits of the shift register 67 are applied serially in parallel to one of the input data registers 70 and 71, it should be understood that only the first eight bits contain useful information when all except the FAX2 resolutions are to be printed. When FAX2 mode resolution is to be printed, all nine bits of the shift register 67 contain meaningful information.

The data in the input data register 70 is stored at a location in the memory 72 in accordance with the address supplied from an address register 76. Similarly, the contents of the input data register 71 are stored in the memory 73 at a location defined by the address from an address register 77.

The actual address inserted in each of the registers 76 and 77 is generated by a counter 78, which can count from one to four hundred and fifty since that is the maximum number of addresses required in either the memory 72 or the memory 73. The number to which the counter 78 counts depends upon the number of source organizer addresses required. While 450 is the number of source organizer addresses per scan line for the resolution as indicated in Table I, the number of source organizer addresses per scan line for the various resolutions varies from 180 to 450 as indicated in Table I.

Since each of the 450 addressable positions in each of the memories 72 and 73 contains nine bits, each of the memories 72 and 73 accommodates 4050 bits in a single scan line. While each of the memories 72 and 73 accommodates nine bits for each of the 450 addressable positions, only eight of the bits contain useful information when the maximum of 450 addressable positions is employed during the FAX4 resolution.

The output of the counter 78 is applied by a switch 79 to either the address register 76 or the address register 77 depending upon the position of the switch 79. The position of the switch 79 is determined by the state of the control signal from the trigger 75 in the same manner as the switch 69.

Thus, when the control signal from the trigger 75 is in one state, the output of the counter 78 is inserted in the register 76, and this is when the data from the shift register 67 is being applied to the input data register 70 since the switches 69 and 79 provide these connections at the same time. When the state of the trigger 75 changes, then the switches 69 and 79 change so that the counter 78 is connected to the address register 77 at the same time that the data from the shift register 67 is being supplied to the input data register 71. Thus, the contents of the scanned lines are inserted alternately in the memories 72 and 73.

A decoder 80 also is connected to the output of the counter 78. The decoder 80 decodes the count of the counter 78 in accordance with the number of source organizer addresses per scan line and resets the counter 78 at the count of one to process the next scanned line. The decoder 80 is connected to the decoder 23 so that the decoder 80 decodes at the count of 450 and resets the counter 78 for the FAX4 resolution. For standard resolution, the decoder decodes at the count of 360 and resets the counter 78 to one. Similarly for FAX1, FAX2, and FAX3 resolutions, the decoder 80 decodes at the count of 180, 240 and 315 respectively and resets the counter 78 to one.

When the counter 78 is connected by the switch 79 to one of the registers 76 and 77 to supply addresses to the memory 72 or 73 to which the address registers 76 and 77 are respectively connected, the other of the address registers 76 and 77 is connected to an address generator 81 through a switch 82. The switch 82 is under the control of the state of the trigger 75 but is receiving the opposite signal to that supplied to the switches 69 and 79. That is, the control output from the trigger 75 is supplied to the switch 82 at the time that the control output from the trigger 75 is supplied to the switches 69 and 79. This is indicated in FIG. 6 by the control signal being shown as the input to the switch 82. It should be understood that the control output from the trigger 75 is supplied to the switch 82 at the time that the control is supplied to the switches 69 and 79.

Thus, at the time that one of the address registers 76 and 77 is connected to the counter 78, the other of the address registers 76 and 77 is being supplied an address from the address generator 81. This is used to address the memory 72 or 73, which is not having data stored therein at that time, to cause the data in the memory 72 or 73 to be read at the time that data is being written into the other of the memories 72 and 73.

The address generator 81 generates an address in accordance with the algorithm:

$$\text{address} = B((L + k'N) \text{MOD } Nt) + W$$

where L is the scan line number, k' is the psuedo nozzle spacing within an array expressed in integer psuedo pels, N is the nozzle number within the array, MOD means modulo, i.e., translating the number into base Nt, and Nt, B, and W have been previously defined.

Accordingly, the address generator 81 receives L, N, and W outputs from the signal value generator 53, while B, Nt, and k' outputs are from decoder 23. Decoder 23 supplies its outputs in accordance with the resolution at which the printer 10 is to operate. Decoder 23 may simply be a ROS memory. For each resolution mode, the ROS memory would read out B, Nt, and k' in accordance with Table I.

When the memory 72 (see FIG. 6) is receiving an address from the address generator 81, the stored data in the memory 72 is transferred to an output data register 85. During the next scan line, the data, which was stored in the memory 73 while the data in the memory 72 was being transferred to the output data register 85, is transferred to an output data register 86. Thus, the contents of each of the memories 72 and 73 are stored during one scan line and removed during the following scan line.

The output data registers 85 and 86 are connected through a switch 87 to main memory 52 (FIG. 3). The switch 87 is responsive to the same state of the trigger 75 as the switch 82. Thus, when the switch 82 connects the address generator 81 with the address register 77 to transfer the data in the memory 73 into the output data register 86, the switch 87 connects the output data register 86 with the memory 52. When the switch 82 is in the position in which the memory 72 is transferring the data therein to the output data register 85, the switch 87 connects the output data register 85 to main memory 52.

When the memory words are read out of main memory 52, they are passed to the appropriate nozzle registers in registers 58 by switch 57 in accordance with the resolution mode from decoder 23. As shown in FIG. 8, switch 57 is made up of nine gates which are enabled by the active nozzle signal N1–N9 (FIG. 7) and the modes from decoder 23. For example, gate 150 for nozzle register 1 is enabled by N1. Gate 151 for nozzle register 2 is enabled by N2 if the resolution mode is not FAX3. In FAX3, nozzle N2 is not used. The same gating condition of not FAX3 is true for the gates for nozzle registers 4, 6 and 8. Gate 152 for nozzle register 3 is enabled by N3 in every mode except FAX3. In FAX3, gate 152 is enabled by N2. This is true because in FAX3 the second nozzle is skipped and the third nozzle prints as if it were the second nozzle. A similar gating condition applies to the gates for nozzle registers 5, 7 and 9. In addition gate 153 for nozzle register 9 is also inhibited in FAX2 mode when nozzle N9 is not used.

While I have illustrated and described the preferred embodiments of my invention, it is understood that I do not limit myself to the precise constructions herein disclosed and the right is reserved to all changes and modifications coming within the scope of the invention as defined in the appended claims.

What is claimed is:

1. In an interlace ink jet printer having a single array containing a plurality, Nt, of nozzles with the nozzles uniformly spaced kD apart, where D is the width of a pel spacing, Nt is the number of nozzles on the array and k is an integer, and having means for passing the print head repeatedly across the print media, means for translating the ink jet print head Nt pel spacings of width D during each pass of the print head across the print media, and means for processing print-data for printing on print lines one pel spacing width D apart, improved apparatus for controlling the printing of various resolutions by the print head, said improved apparatus comprising:
   means for setting a pseudo pel spacing width D', where D' equals (k'/k)D, and k' is an integer and has no common factor with Nt, to provide a new resolution R' equal to (k'/k)R where R is the old resolution;
   translational control means responsive to said setting means for controlling said translating means to translate said print head Nt pseudo pel spacings of width D' during each pass of the print head across the print media;
   data control means responsive to said setting means for controlling said print-data processing means to process said print-data for printing on print lines one pseudo pel spacing width D' apart.

2. The apparatus of claim 1 and in addition:
   means for setting the number Nt of nozzles used by the print head to Nt' by not using one or more end nozzles of the array when k' and Nt have a common factor.

3. The apparatus of claim 1 and in addition:
   means for setting k equal to mk by using only every mth nozzle in the array for printing whereby D' equals (k'/mk)D and there is less seperation between resolutions available to the printer.

4. The apparatus of claim 1 and in addition:
   means for adjusting the speed of the print head in the pass direction to adjust the resolution in the pass direction.

5. The apparatus of claim 1 wherein said data control means adjusts the pel spacing width D to the pseudo pel spacing width D' by setting k to k' in said print-data processing means.

6. The apparatus of claim 5 and in addition:
   means for setting the number Nt of nozzles used by the print head to Nt' by not using one or more end nozzles of the array when k' and Nt have a common factor.

7. The apparatus of claim 5 and in addition:
   means for enabling every "m"th nozzle in the array to print whereby D' equals (k'/mk)D and there is less separation between resolutions available to the printer.

8. In a method for controlling the printing of various resolutions by an interlace ink jet printing system having a single array containing a plurality, Nt, of nozzles with the nozzles uniformly spaced k pel spacings apart, where Nt is the number of nozzles on the array and k is the number of actual pel spacings between nozzles, said method comprises the steps of:
   passing the ink jet print head repeatedly across the print media;
   translating the ink jet print head Nt pel spacings during each pass of the print head across the print media;
   processing print-data for printing on print lines one pel spacing apart;
   assigning a pseudo pel spacing of k' pseudo pels between nozzles on the array where k' is an integer and has no common factor with Nt;
   adjusting the translation during said translation step so that said print head moves Nt pseudo pel spacings during each pass across the print media;
   adjusting said print-data processing steps so that said print-data may be printed on print lines one pseudo pel spacing apart whereby the new print resolution, R', of the system is given by the expression: $R'=(k'/k)R$ where R is the old resolution.

9. The method of claim 8 and in addition:
   inhibiting printing by one or more of the end nozzles on the array so that k' and Nt do not have a common factor.

10. The method of claim 8 and in addition:
    enabling only every "m"th nozzle for printing so that k equals mk whereby R' equals (k'/mk)R and there is less separation between resolutions available to the printer.

* * * * *